United States Patent [19]

Carcia et al.

[11] Patent Number: 4,876,566
[45] Date of Patent: Oct. 24, 1989

[54] CAMERA HAVING AUTO-TRIM EXPOSURE CONTROL

[75] Inventors: Peter P. Carcia; Judith N. Coltman, both of Reading, Mass.

[73] Assignee: Polaroid Corporation, Cambridge, Mass.

[21] Appl. No.: 258,879

[22] Filed: Oct. 17, 1988

[51] Int. Cl.$^4$ .............................................. G03B 7/08
[52] U.S. Cl. ...................................... 354/436; 354/483
[58] Field of Search ......................... 354/436, 437, 483

[56] References Cited

U.S. PATENT DOCUMENTS

| | | | |
|---|---|---|---|
| 3,620,143 | 11/1971 | Burgarella | 95/10 C |
| 3,942,183 | 3/1976 | Whiteside | 354/29 |
| 4,199,244 | 4/1980 | Shenk | 354/195 |
| 4,199,246 | 4/1980 | Muggli | 354/195 |
| 4,209,243 | 6/1980 | Johnson et al. | 354/30 |
| 4,209,506 | 6/1980 | Johnson et al. | 354/483 |
| 4,342,506 | 8/1982 | Johnson et al. | 354/483 |
| 4,717,935 | 1/1988 | Anacreon | 354/483 |

*Primary Examiner*—Russell E. Adams
*Attorney, Agent, or Firm*—John J. Kelleher

[57] ABSTRACT

An exposure control system in a self-developing camera having a user trim adjustment for manually varying the exposure time of a picture over a limited range of exposure times is provided with a photocell for measuring the level of ambient light in a scene to be photographed and a memory for temporarily storing this scene light information. If after taking a picture of a particular scene the camera operator determines that the resulting photograph was either too light or too dark and chooses to take another picture of the particular scene, the trim control is manually adjusted to obtain the desired picture brightness level. In the present arrangement, when the particular scene is re-framed and the trim control is adjusted, the ambient scene light information stored in memory is varied, and not the ambient scene light subsequently sensed by the photocell in order to compensate for the fact that upon re-framing the scene the photocell sees a different portion of the same scene and therefore a different ambient scene light level and that the intent of the operator in such instances is to alter the exposure time relating to the initial scene that produced the unwanted scene light conditions and not that relating to the re-framed scene.

11 Claims, 2 Drawing Sheets

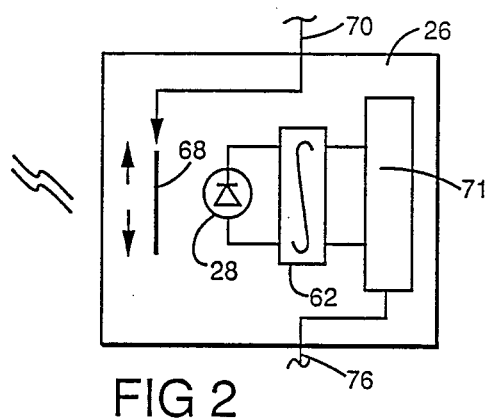
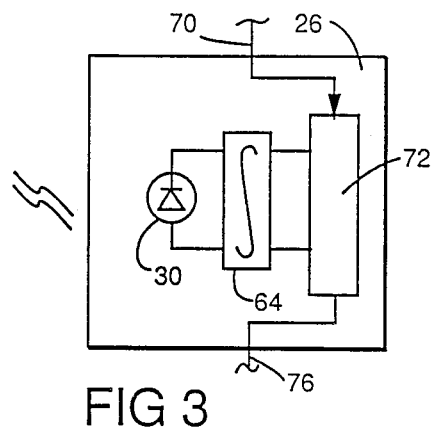
FIG 2
FIG 3

CAMERA HAVING AUTO-TRIM EXPOSURE CONTROL

BACKGROUND OF THE INVENTION

1. Field of the Invention

The present invention relates to an exposure control system for a photographic camera, in general, and to a method and apparatus for manually adjusting the nominal exposure time employed in one film exposure cycle for use in a subsequent or second exposure cycle, in particular.

2. Description of the Prior Art

Fully automatic exposure control systems, such as the exposure control system employed in a camera manufactured by Polaroid Corporation of Cambridge, Mass., and sold under its registered trademark "Spectra Camera System" are well known in the art. These automatic exposure control systems have been incorporated within various amateur cameras for simplifying their operations by minimizing the pre-exposure adjustments to be made by a camera operator. These exposure control systems function to automatically regulate the exposure parameters for a given scene. Generally the exposure control systems are designed for use over a wide range of scene lighting conditions.

Since a large majority of amateur pictures are taken within the range of light levels to which the control system is suited, properly exposed photographs are normally obtained. However, the camera operator may wish to take a photograph which is lightened or darkened to his personal taste, may wish to accommodate for unusual lighting effects such as backlighting, highlights or the like, or may wish to account for slight variations in the sensitometric characteristics of the film. In order to adjust the automatic exposure for such personal taste, unusual effects or sensitometric characteristics, a lighten-darken trim system is provided. These trim systems usually supply the camera user with a manual one-half to one stop optional exposure adjustment above or below the exposure value otherwise established automatically.

Two types of trim control systems currently employed in photographic cameras of the self-developing type are described in U.S. Pat. No. 4,209,243, issued June 24, 1982, to Johnson et al, and in U.S. Pat. No. 4,717,935 issued Jan. 5, 1988 to Anacreon. In Johnson et al, the amount of scene light admitted to the film plane of a camera is dependent upon the amount of light passing from the scene to a photocell through a variable density filter slidably mounted on the camera body that varies the amount of scene light sensed by the photocell. The exposure control system may be trimmed to either an underexposure mode upon movement of the slide to reduce the filter density and thus increase the ambient light sensed by the photocell to a value above that indicated for normal exposure, or to an overexposure mode by moving the slide in the opposite direction to increase filter density and thus reduce the amount of light sensed by the cell to a value below that which would pass the filter for normal exposure. In the Anacreon reference, supra, the amount of scene light admitted to the film plane of a camera is also dependent upon the magnitude of an electrical signal generated by an ambient scene light sensing photocell. However, in the trim control apparatus disclosed in Anacreon, the trim adjustment is made by manually increasing or decreasing the magnitude of the electrical signal actually generated by the light sensing photocell representative of ambient scene light, in accordance with the degree of exposure desired above or below a normal exposure.

If after taking a picture of a particular scene, the camera operator determines that the resulting self-developing photograph was either too light or too dark and chooses to take another picture of the particular scene, the particular scene is re-framed and the trim control is manually adjusted. Upon re-framing the scene, the camera's brightness level sensing photocell normally sees a different portion of the same scene and therefore a different ambient scene light level. In such instances, it is the intent of the camera operator to alter the exposure time relating to the initially framed scene that produced the unsuitable scene lighting condition and the improperly exposed photograph and not the exposure time relating to the re-framed scene.

SUMMARY OF THE INVENTION

It is a primary object of the present invention, therefore, to provide a user trim adjustment for a self-developing camera which can be used to increase or decrease the nominal exposure time of a previously photographed scene.

It is another object of the present invention to provide a user trim adjustment for a self-developing camera which can be used to increase or decrease the nominal exposure time of a previously photographed scene if the difference in scene brightness levels between two successive exposure related scene light measurements is less than some predetermined magnitude and the second of the two successive exposures is initiated within a predetermined time after the initiation of the first of the successive scene light measurements.

Other objects, features and/or advantages of the present invention will be readily apparent from the following detailed description of a preferred embodiment thereof when taken in conjunction with the accompanying drawings.

In accordance with a preferred embodiment of the present invention, an exposure control system for a self-developing camera is provided with a user trim adjustment for manually varying the exposure time for generating a photographic image of a particular scene either before or after the particular scene is photographed. Means are provided for generating an electrical signal representative of the magnitude of the ambient brightness level of a scene to be photographed, for storing said scene brightness level signal for a predetermined period of time and for comparing the magnitude of the ambient scene brightness levels of two successive exposures. If after making a photographic image of a particular scene, a camera operator determines that the resulting photograph was either too light or too dark and chooses to take another picture of the particular scene, the trim control is manually adjusted to obtain the desired picture brightness level. If the trim adjustment is made within the predetermined period of time and if the difference in ambient scene brightness levels between the two successive scene light measurements is less than some predetermined magnitude, the trimmed scene light brightness level signal associated with the first of said successive scene light measurements will be employed for exposure control purposes. However, if the second of said scene light measurements is made at a time later than said predetermined period of time or if the difference in brightness level between said two successive scene light measurements is greater than said predetermined magnitude, the trimmed scene light brightness level signal associated with the second of said successive scene light measurements will be employed for exposure control purposes.

BRIEF DESCRIPTION OF THE DRAWINGS

FIG. 2 is a preferred embodiment of the light integrating and trim assembly of FIG. 1 wherein the amount of scene light sensed by the photocell is controlled by a variable density filter; and FIG. 3 is an alternate embodiment of the light integrating and trim assembly of FIG. 1 wherein the exposure time is trimmed by directly varying the magnitude of the scene light brightness level signal generated by a scene light brightness level detecting photocell.

DESCRIPTION OF A PREFERRED EMBODIMENT

Figure 1:
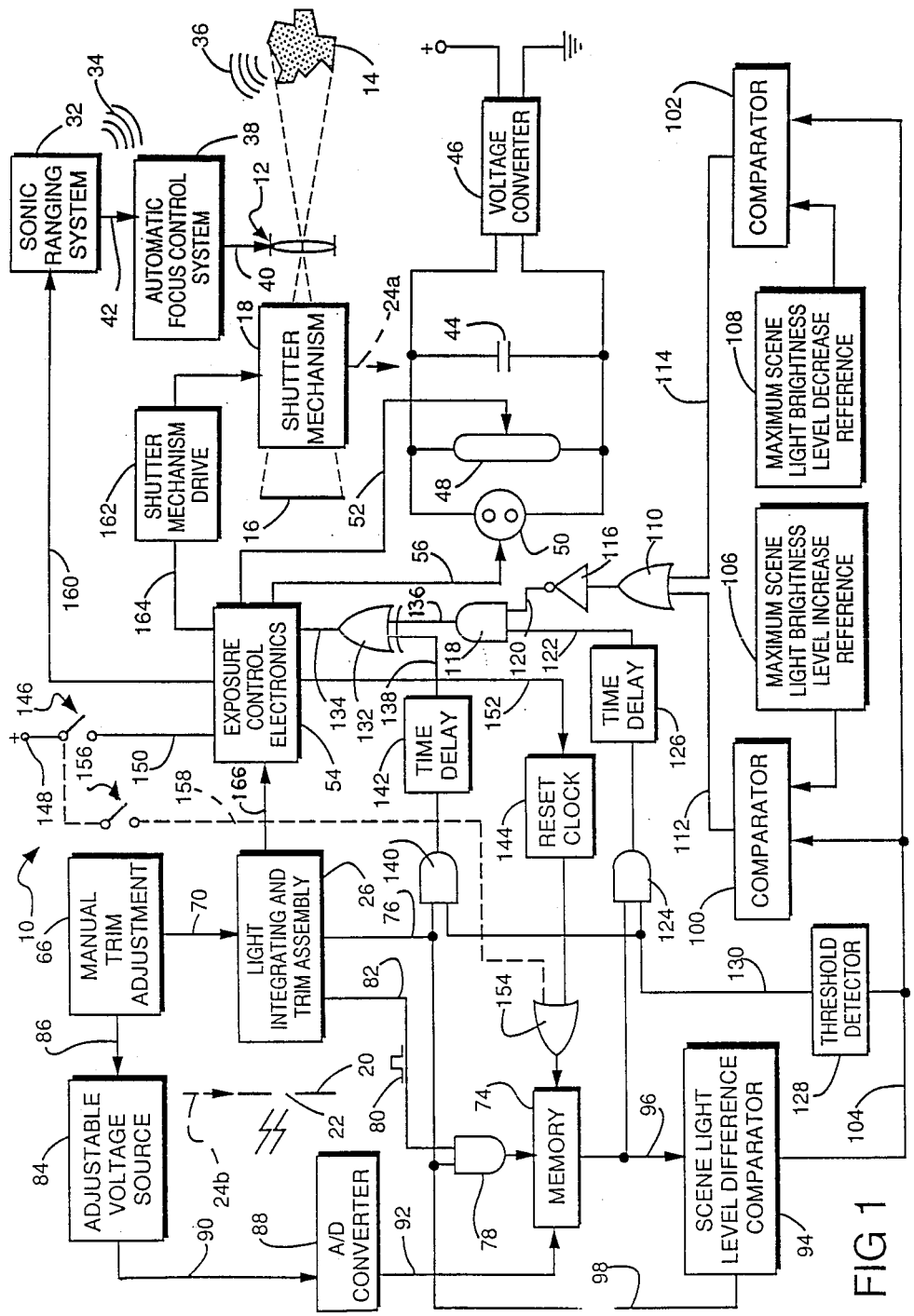
FIG. 1 is a functional block diagram of a photographic camera incorporating a preferred embodiment of the exposure control, user trim adjustment of the present invention.

Referring now to the drawings, and specifically to FIG. 1, there is shown a functional block diagram of a photographic camera 10 incorporating a preferred embodiment of an exposure control, user trim adjustment of the present invention. The camera 10 includes an objective or taking lens 12 comprising a plurality of elements retained in spaced relation by a conventional cylindrical lens mount which may be adapted in a well-known manner to provide translational movement of the elements of the lens 12 along a central optical axis for focusing image-carrying light rays of, for example, an object 14 on a film plane 16 through an aperture formed in a shutter mechanism 18.

The shutter mechanism 18, positioned intermediate of the lens 12 and the film plane 16, includes a pair of overlapping shutter blade elements of the "scanning " type, small portions of which are schematically shown at 20. A scene light admitting primary aperture (not shown) is provided in each of the shutter blade elements to cooperatively define a progressive variation of effective aperture openings in accordance with simultaneous longitudinal and lateral displacement of one blade element with respect to the other blade element in a manner more fully described in U.S. Pat. No. 3,942,183, infra, now specifically incorporated herein by reference.

The blade element primary apertures are selectively shaped so as to overlap the central axis of the lens 12 thereby defining a gradually varying effective aperture size as a function of the position of the blade elements of the shutter mechanism 18. Drive means are provided for displacing the blade elements. The drive means include a tractive electromagnetic device in the form of a solenoid (not shown) employed to displace the shutter blade elements with respect to one another in a manner more fully described in U.S. Pat. No. 3,942,183 entitled "Camera with Pivoting Blades" by G. Whiteside, issued Mar. 2, 1976, in common assignment herewith.

Each of the shutter blade elements additionally includes a secondary aperture (not shown in detail) with an aperture in one blade element cooperating with an aperture in another blade element to form opening 22 therethrough. These secondary apertures may be configured to track in a predetermined corresponding relationship with respect to the scene light admitting primary apertures (not shown) within the shutter mechanism 18. With the primary and secondary apertures being formed in the same blade elements and therefore being mechanically coupled to one another through path 24a, 24b, it is readily apparent that the secondary apertures move in the same manner as the primary apertures. The secondary apertures move in the same direction as the primary apertures when controlling scene light passing through secondary-aperture-formed opening 22, transmitted from a scene being photographed, to a photoresponsive element or photocell within a light integrating and trim assembly 26 such as the photocells 28 and 30 shown in FIGS. 2 and 3, respectively. An example of scanning blade elements having primary and secondary apertures that cooperate to control the amount of scene light admitted to a single photosensitive element is shown in U.S. Pat. No. 3,942,183, supra.

The photographic camera 10 is provided with a sonic ranging system 32 that includes a ranging circuit and an ultrasonic transducer (not shown) which may be actuated to transmit a burst of sonic energy 34 toward a subject to be photographed, such as the subject 14. The transducer thereafter operates to detect an echo 36 of the burst of sonic energy reflected from the subject 14. The total round trip time for a burst of sonic energy to be transmitted toward and for an echo thereof to be reflected from the subject 14 and detected by the transducer of the sonic ranging system 32 is a fairly accurate measure of camera-to-subject distance. An electrical signal representative of this round trip time is subsequently employed to focus the adjustable focus lens 12. U.S. Pat. No. 4,199,246 to J. Muggli describes such a sonic rangefinder in much greater detail. An automatic focus control system 38, coupled to the adjustable focus lens 12 through a path 40, causes the lens 12 to focus an image of the subject 14 onto the film plane 16 during an exposure, in response to an electrical subject distance related signal from the sonic ranging system 32 through a path 42. An example of an automatic focus control system functioning in this manner is more fully described in U.S. Pat. No. 4,199,244 to Shenk.

The camera 10 is also provided with an electronic flash apparatus together with apparatus for controlling its energization, to provide a portion of the exposure value required to illuminate a scene to be photographed. The electronic flash apparatus comprises a main storage capacitor 44 which may be charged up to an operating voltage by any conventional voltage converter circuit (not shown) which would be included within the voltage converter 46. Voltage converter 46 operates in a conventional manner to convert a dc voltage as may be derived from a camera's battery (not shown), which can be in the order of 6 volts, to a suitable operative voltage such as 350 volts. A flash tube 48 and a quench tube 50 for interrupting the flash discharge of the flash tube 48 are connected in a parallel relation with respect to the main storage capacitor 44. The flash tube 48 may be energized by a suitable trigger signal on a path 52 from a conventional trigger circuit (not shown) within an exposure control electronics module 54, and the quench tube 50 may be ignited by a suitable trigger signal on a path 56 from another conventional trigger circuit (not shown) that is also included within the exposure control electronics module 54.

As previously stated, the camera 10 includes the light integrating and trim assembly 26 in which is preferably located the photocell 28 and an integrater 62, as shown in drawing FIG. 2, or alternatively, the photocell 30 and an integrator 60 as shown in drawing FIG. 3. With additional reference to FIGS. 2 and 3, when energized, photoresponsive elements or photocells 28 and 30 sense the intensity of scene light present in a scene to be photographed. Each of these photocells includes a photosensitive surface that converts the sensed scene light into an electrical signal representative of the intensity of scene light present in such a scene. The scene light level signal from photocell 28 is then applied to a scene light intensity integrator 62 that integrates the total amount of light present in this scene and generates an electrical signal representative thereof as is more fully described in U.S. Pat. No. 3,620,143 to J. Burgarella, and now specifically incorporated herein by reference. A similar signal is generated by an integrator 64 in FIG. 3 when the output of photocell 30 is applied to the input of the integrator 64.

If the amount of scene light sensed by the photocells 28 and 30 results in an under-exposed or an over-exposed photograph, a manually operated user trim adjustment is provided so that a camera operator can alter the exposure control system in order to compensate for such improper or unwanted exposure. However, even though the scene light sensing and integrating appartus in FIGS. 2 and 3 function in the same way and are trimmed by a camera operator in the same manner, the trim mechanisms in each of these apparatuses operate differently. In the apparatus of FIG. 2, the movement of a manual trim adjustment 66 is coupled to a variable density filter 68 through a path 70. Movement of the filter 68 varies the amount of scene light sensed by the photocell 28 which, in turn, indirectly varies the magnitude of the signal generated by the photocell 28 in correspondence with measured scene light intensity levels and subsequently applied to the module 71. In the apparatus of FIG. 3, movement of the manual trim adjustment 66 is coupled to a variable electrical component in an electrical circuit (not shown) within a signal processing electronics module 72 such as a variable resistor or the like. Changing the effective value of such a component would, in turn, directly change the magnitude of the scene light signal within the module 72 actually generated by the photocell 30.

The function of the trim portion of the light integrating and trim assembly 26 and manual trim adjustment 66 coupled thereto is to vary the amount of scene light transmitted to the film plane 16 through the primary apertures of the scanning blade shutter (not shown) included within the shutter assembly 18, above or below the nominal value otherwise established by the scene light integrating and trim assembly 26. Whichever of the scene light measuring apparatuses of FIGS. 2 or 3 is employed, the total scene light signal generated by light integrating and trim assembly 26 is subsequently routed to and is digitally stored in an eraseable memory 74 by way of a path 76 and an AND gate 78 when the AND gate 78 is momentarily enabled by a pulse 80 from the assembly 26 through a path 82.

In addition to the movement of the manual trim adjustment 66 being coupled to the light integrating and trim assembly 26 in the above-described manner, the movement of the manual trim adjustment 66 is also coupled to an adjustable voltage source 84 through a path 86. The movement of the manual trim adjustment 66 varies the voltage source 84 output voltage above and below a nominal output voltage representative of a zero trim adjustment. The output of the adjustable voltage source 84 is applied to the input of an analog-to-digital (A/D) converter 88 through a path 90. The A/D converter 88 changes the output voltage of the adjustable voltage source 84 to a series of positive or negative pulses that are respectively representative of the extent of exposure trim adjustment by the manual trim adjustment 66 above or below a nominal exposure established by the light integrating and trim assembly 26. The output pulses of the A/D converter 88 are routed to the eraseable memory 74 through a path 92. These converter 88 pulses are summed with the total scene light signal digitally stored in the memory 74, as previously explained. When these trim pulses from the A/D converter 88 are summed with the digital scene light signal in the memory 74, the resulting stored signal represents an initially determined scene light signal as modified by the camera operator with the manual trim adjustment 66.

The scene light signal stored in the memory 74 is subsequently applied to a scene light level difference comparator 94 through a path 96. A scene light measurement signal derived by the light integrating and trim assembly 26 during a second or subsequent exposure is also applied to the scene light level difference comparator 94 through the path 76 and a path 98. The comparator 94 then generates a signal equal to the difference between these two signals which is then routed to a pair of comparators 100 and 102 through a path 104. The comparator 100 has two different inputs. The first one, as noted, comes from the output of the comparator 94 and the other input comes from the maximum scene light brightness level increase reference 106. The comparator 100 together with the reference 106 establish the upper limit of the difference between two successive scene brightness level signals to be employed by the exposure control electronics 54 for exposure control purposes. The comparator 102 also has two different inputs. In addition to the input from the output of the comparator 94, another input comes from the maximum scene light brightness level decrease reference 108. The comparator 102 together with the reference 108 establish the lower limit of the difference between the same two successive scene brightness level signals to be employed by the exposure control electronics 54 for exposure control purposes. The comparators 100 and 102 generate an output signal only if the input from the comparator 94 is greater than the maximum increase reference signal of the reference 106, or greater than the maximum decrease reference signal of the reference 108, respectively. The maximum allowable increase or decrease in scene light brightness levels between two successive exposure intervals is preferably limited to two f-stops.

The outputs of the comparators 100 and 102 are routed to an OR gate 110 through a path 112 and a path 114, respectively. The OR gate 110 produces an output whenever it receives an input from either the comparator 100 or the comparator 102. An inverter 116, in its normal state, applies an input signal to one of the two inputs of an AND gate 118 through a path 120. An output from the inverter 116 is precluded when an output signal is present at the output of the OR gate 110.

The other input to the AND gate 118 consists of the first of two successive scene brightness level signals of a particular scene stored in the eraseable memory 74. This stored brightness level signal is applied to the AND gate 118 through a path 122 when an AND gate 124 has been enabled, the output of the AND gate 124 has been applied to a time delay 126, and the time delay interval introduced by the time delay 126 has expired. The AND gate 124 is enabled for the passage of a stored scene light brightness level signal therethrough when the output of the comparator 94 exceeds some predetermined value. The output of the comparator 94 is monitored by a threshold detector 128. When the output of the comparator 94 exceeds this predetermined value, the threshold detector 128 generates an enable signal which is routed to the AND gate 124 by way of a path 130.

An exclusive OR gate 132 has two different inputs. The output of the exclusive OR gate 132 is applied to the exposure control electronics module 54 through a path 134. Only the first of these two different inputs will be applied to the exposure control electronics module 54 by the exclusive OR gate 132 even if both are ultimately applied to the input thereof. One of the two inputs to the exclusive OR gate 132 is the stored brightness level signal from the eraseable memory 74 by way of the AND gate 118 and a path 136. The other input to the OR gate 132 is the second of two successive scene brightness level measurement signals of the same aforementioned particular scene, generated by the light integrating and trim assembly 26. This second successive scene brightness level signal is applied to the input of the exclusive OR gate 132 through a path 138 when an AND gate 140 has been enabled, the output of the AND gate 140 has been applied to a time delay 142 and the time delay interval introduced by the time delay 142 has expired. The AND gate 140 is enabled for the passage of the second successive scene brightness level signal, by the threshold detector 128 in the same manner that the AND gate 124 is enabled by the same detector 128.

As previously explained, the first of two successive scene light measurement signals is stored, in a digital format, in the eraseable memory 74. The length of time that the first scene light measurement signal remains in the memory 74 is preferably limited to five minutes so that the exposure control system of the camera 10 can be ready to photograph a different scene under substantially different scene lighting conditions. However, scene light signal storage times that are greater or less than five minutes may also be employed.

A scene light measurement signal stored in the memory 74 is erased by a reset clock 144. An exposure cycle is initiated by the manual closure of a switch 146. This switch closure applies a voltage source (not shown) connected to a terminal 148 to the exposure control electronics module 54 through a path 150. The exposure control electronics module 54, in response thereto, applies a signal to the reset clock 144 through a path 152 to thereby start the clock 144. After the time has expired for the clock 144 to time out (preferably five minutes) a reset signal is applied to the memory 74 by the clock 144 through an OR gate 154 to thereby erase any scene light brightness level signal stored in the memory 74.

If it is concluded that an automatic memory erase feature such as that provided by the reset clock 144 might, in some instances, take too long to erase a scene brightness level signal from the memory 74, an optional manual memory erase feature could also be provided. In such an instance, a switch 156 would be provided. The manual closure of this switch 156 would apply the voltage source (not shown) connected to the terminal 148 to the memory 74 through a path 158 and the OR gate 154 and thereby immediately erase the contents of the memory 74.

OPERATION

A typical film exposure and subsequent trim adjustment sequence will now be described. With reference to FIG. 1 of the drawings, the switch 146 is closed by a camera operator causing the exposure control electronics module 54 to initiate an exposure cycle. The exposure control electronics module 54 actuates the sonar ranging system 32 through a path 160 to derive a subject 14 to camera 10 distance signal which is then employed by the focus control system 38 to adjust the lens 12 to the correct focus position. The exposure control electronics module 54 then actuates a shutter mechanism drive 162 and the shutter mechanism 18 coupled thereto through a path 164 to initiate the movement of the scanning blades 20 within the shutter mechanism 18. Light integrating and trim assembly 26 measures the scene brightness level through apertures 22 in the scanning blades 20 and applies a signal representative of this measured scene light level to the exposure control electronics module 54 through a path 166. This brightness level signal is also applied to the eraseable memory 74 for temporary storage therein through the path 82 and the AND gate 78 that is momentarily enabled by the pulse 80 from the assembly 26. This scene light brightness level signal is employed by the exposure control electronics module 54 to control the exposure interval established by the scanning blades 20 within the shutter mechanism 18 and the amount of artificial light output of the flash tube 48 when operated in the above-described manner.

An assumption is made that an over or under exposed self-developing photograph of a particular scene is initially produced by the camera 10. Consequently, a camera 10 operator would manually vary the initial scene light brightness level signal stored in the memory 74 the appropriate amount by adjusting the manual trim adjustment 66. The specifics of how the scene light signal stored in the memory 74 is actually changed, is described above in detail.

After the initial scene brightness level signal stored in the memory 74 has been trimmed by the camera 10 operator, a second exposure of the same scene that produced the just-mentioned improper exposure is initiated. A second exposure cycle is initiated by a second manual closure of the switch 146. Closure of the switch 146 causes the exposure control electronics module 54 to actuate the sonic ranging system 32 and the focus system 38 to automatically adjust the lens 12 to the correct focus position in the same manner that the lens 12 was adjusted for the initial exposure.

Light integrating and trim assembly 26 once again measures the scene brightness level as it did just prior to the initial exposure interval and then simultaneously applies a signal representative thereof to an input of the scene light level difference comparator 94 through the paths 76 and 98 and an input of the AND gate 140 through the path 76. This second scene light signal is prevented from entering the memory 74 by the AND gate 78, and is prevented from starting the time delay 142 by the AND gate 140. The initial scene light signal in the memory 74 and the second scene light signal of substantially the same particular scene are compared in the comparator 94. The output of the comparator 94, which is the difference between these two input signals, is simultaneously applied to the comparators 100 and 102. If this difference signal is less than the maximum increase and decrease scene light brightness levels signals as established by the reference signals 106 and 108, respectively, then neither comparator 100 nor comparator 102 will generate an output signal, and therefore the inverter 116 will remain in its normal or output-generating state.

The output of the difference comparator 94 is monitored by the threshold detector 128, as previously explained. When the detector 128 senses a difference comparator 94 output, it enables the AND gate 124 which, in turn, causes the contents of the memory 74 to be applied to the input of the time delay 126 and then to an input of the AND gate 118 after the time delay 126 has timed out. The purpose of the time delay 126 is to provide time for the comparators 100 and 102 to determine if the difference signal generated by the comparator 94 is within the limits established by the reference signals 106 and 108 before the contents of the memory 74 is applied to the AND gate 118. If, on the one hand, the AND gate 118 is satisfied (i.e., receives the required two inputs), then the trimmed scene light brightness level signal stored in the memory 74 will be applied to the exposure control electronics module 54 through the exclusive OR gate 132 where it will be employed to control the shutter mechanism 18 and the flash tube 48 during the subsequent exposure interval in the same manner that these subsystems were controlled during the first exposure interval.

If, on the other hand, the brightness difference signal was greater than the limits set by the reference signals 106 or 108, it would be an indication that the two successive scene light brightness level signals were produced by scenes that were substantially different in brightness levels from one another. In such an instance, the second of the two successive brightness level signals would be employed. A brightness level signal outside of the limits set by the reference signals 106 or 108 would disable the AND gate 118. When this occurs, the second scene light brightness level signal established by the light integrating and trim assembly 26 would be applied to the exposure control electronics module 54 through the AND gate 140, then the time delay 142 after it has timed out, and then the exclusive OR gate 132.

The second scene light brightness level signal to be generated within the assembly 26 is trimmed before the actual generation thereof by the manual trim adjustment 66 and by the trim mechanism of either FIGS. 2 or 3 at the same time that the initial scene light brightness level signal within the memory 74 is trimmed by the same movement of the manual trim adjustment 66. Also, the AND gate 140 was enabled by the threshold detector 128 at the same time that the AND gate 124 was enabled by this same detector. The function of the time delay 142 is to enable the logic circuitry associated with the memory 74 and the output of the difference comparator 94 to determine if the initial scene light measurement signal is the appropriate one to control the second successive exposure. The length of the time delay 142 is chosen such that it permits this decision by being significantly longer than the time delay 126. If it should occur that the second successive scene light brightness level signal is applied to the exposure control electronics module 54, the second signal rather than the first would be employed to control the shutter mechanism 18 and the flash tube 48 during the subsequent exposure interval in the same manner that these subsystems were controlled during the first exposure interval.

Within a predetermined length of time after the initiation of the first of two successive exposures, and preferably within five minutes thereof, the reset clock 144 will time out and erase the contents of the memory 74 by applying its output to the memory 74 through the OR gate 154. If it should be determined that the length of time required for the reset clock 144 to erase the memory 74 is excessive, a manual override could be provided. A manually actuated switch 156, for example, would instantly erase the contents of the memory 74, in the above-described manner, when momentarily actuated to its closed position.

When discussing the effects of adjusting the manual trim adjustment 66 of the camera 10, it has been described herein as an adjustment of the exposure interval above or below some nominal value. It should be noted, however, that an exposure interval is established by a combination of aperture size and shutter speed. The term "trim adjustment" as employed herein means to adjust an exposure interval or to independently adjust the parameters of aperture size and/or shutter speed comprising such an interval.

From the foregoing description of the invention, it will be apparent to those skilled in the art that various improvements and modifications can be made in it without departing from its true scope. The embodiments described herein are merely illustrative and should not be viewed as the only embodiments that might encompass the invention.

What is claimed is:

1. An exposure control system for a self-processing camera having means for defining a film plane and an optical system for directing light along an optical path from a scene onto photosensitive material located in the film plane, said exposure control system comprising:
   a blade mechanism mounted for movement between a blocking arrangement in which said blade mechanism is in light blocking relation with respect to the optical path so as to preclude scene light from being transmitted along the optical path to the film plane and an unblocking arrangement in which said blade mechanism is in light unblocking relation with respect to said optical path so as to allow the passage of scene light to the film plane;
   drive means for displacing said blade mechanism between its said blocking and unblocking arrangements to define an exposure interval;
   first means for generating a first electrical signal representative of the magnitude of the brightness level of a scene to be photographed;
   means for storing said first signal for a predetermined period of time;
   second means for generating a second electrical signal representative of the difference in magnitude between said stored first signal and a scene light brightness signal generated by said first generating means subsequent to the generation of said first light signal and within said predetermined period of time;
   trim control means for manually increasing or decreasing the magnitude of a scene light brightness level signal and said stored first signal over a limited range of corresponding scene light brightness levels;
   third means for generating a third signal indicating that the difference in magnitude between said stored first signal and said subsequently generated scene light brightness level signal exceeds some predetermined magnitude; and control means for actuating said drive means to effect the displacement of said blade mechanism to produce an exposure interval of a first value in the absence of generating of said third signal, and for producing an exposure interval of a second value upon the receipt of said third signal.

2. The exposure control system of claim 1 wherein said first means includes a photosensitive element including a photosensitive surface and said trim control means includes a manually displaceable variable density filter interposed between a scene to be photographed and said photosensitive surface for varying the amount of scene light sensed by said photosensitive element and the magnitude of the electrical signal generated by said photosensitive element in correspondence therewith.

3. The exposure control system of claim 1 wherein said first means includes a photosensitive element for generating a signal representative of the level of light in a scene to be photographed and said trim control means includes electrical circuit means for varying the output signal generated by said photosensitive element.

4. The exposure control system of claim 1 wherein said first signal storing means includes an eraseable memory and said exposure control system further includes means for automatically erasing the contents of said eraseable memory a predetermined time after the initiation of an exposure interval.

5. The exposure control system of claim 4 wherein the said predetermined time for automatically erasing the contents of said eraseable memory is approximately five minutes after the initiation of an exposure interval.

6. The exposure control system of claim 1 wherein said first signal storing means includes an eraseable memory and further includes means for manually erasing the contents of said eraseable memory subsequent to the storage of said first signal therein.

7. The exposure control system of claim 1 wherein the said predetermined magnitude corresponding to the generation of said third signal is equal to a predetermined difference in scene light brightness level magnitude of approximately two f-stops.

8. The exposure control system of claim 1 further comprising an energizeable flash tube for artificially illuminating a scene to be photographed, and said control means further includes means for energizing said flash tube during an exposure interval.

9. A method of manually varying an exposure interval, to a limited degree, of an automatic exposure control system for a self-processing camera having means for defining a film plane and an optical system for directing light along an optical path from a scene onto photosensitve material located in the film plane comprising the steps of:

mounting a blade mechanism for movement between a blocking arrangement in which said blade mechanism is in light blocking relation with respect to the optical path so as to preclude scene light from being transmitted along the optical path to the film plane and an unblocking arrangement in which said blade mechanism is in light unblocking relation with respect to said optical path so as to allow the passage of scene light to the film plane;

generating a first electrical signal representative of the magnitude of the brightness level of a scene to be photographed during a first exposure cycle;

storing said first signal for a predetermined period of time;

during a second exposure, generating another electrical signal representative of the magnitude of the brightness level of a scene to be photographed subsequent to the generation of said first electrical signal;

generating a second electrical signal representative of the difference in magnitude between said stored first signal and said subsequently generated another signal, within said predetermined period of time;

providing means for manually increasing or decreasing the magnitude of said stored first signal and said subsequently generated another signal over a limited range of corresponding scene light brightness levels;

generating a third signal if said second signal exceeds some predetermined magnitude; and displacing said blade mechanism for producing an exposure interval of a first value in the absence of the generation of said third signal, and for producing an exposure interval of a second value upon the receipt of said third signal.

10. The method of claim 9 further including the step of automatically erasing said stored first signal at the end of the predetermined period of time.

11. The method of claim 9 further including the step of manually erasing said stored first signal if a substantially different scene is to be photographed within the predetermined period of time.

* * * * *